(12) United States Patent
Jeon et al.

(10) Patent No.: US 12,469,155 B2
(45) Date of Patent: Nov. 11, 2025

(54) FOCAL STACK ALIGNMENT METHOD AND DEPTH ESTIMATION METHOD USING THE SAME

(71) Applicant: GIST (Gwangju Institute of Science and Technology), Gwangju (KR)

(72) Inventors: Hae-Gon Jeon, Gwangju (KR); Chang Yeon Won, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 401 days.

(21) Appl. No.: 18/158,868

(22) Filed: Jan. 24, 2023

(65) Prior Publication Data

US 2023/0377177 A1    Nov. 23, 2023

(30) Foreign Application Priority Data

May 18, 2022    (KR) .................... 10-2022-0060800

(51) Int. Cl.
*G06K 9/00*   (2022.01)
*G06T 7/215*  (2017.01)
*G06T 7/35*   (2017.01)

(52) U.S. Cl.
CPC .............. *G06T 7/35* (2017.01); *G06T 7/215* (2017.01); *G06T 2207/20081* (2013.01); *G06T 2207/20084* (2013.01)

(58) Field of Classification Search
CPC . G06T 7/35; G06T 7/215; G06T 2207/20081; G06T 2207/20084; G06T 7/33; G06T 7/571; G06T 7/30; G06T 3/18; G06T 3/40; G06T 2207/10028
See application file for complete search history.

(56) References Cited

U.S. PATENT DOCUMENTS

| | | | |
|---|---|---|---|
| 9,712,738 B2 * | 7/2017 | Van Heugten | H04N 23/959 |
| 11,036,983 B1 * | 6/2021 | Nelson | G06T 7/11 |
| 11,257,272 B2 * | 2/2022 | Rowell | G06T 1/0014 |
| 11,321,873 B1 * | 5/2022 | Bauer | B64U 20/87 |
| 11,624,708 B2 * | 4/2023 | Chang | G06V 20/69 382/128 |
| 11,830,163 B2 * | 11/2023 | Wong | G06T 7/174 |
| 11,902,665 B2 * | 2/2024 | Walden, II | H04N 17/002 |

(Continued)

FOREIGN PATENT DOCUMENTS

| | | | | |
|---|---|---|---|---|
| AU | 2016314704 A1 * | 2/2018 | ............ | G06K 9/469 |
| CN | 113383225 A * | 9/2021 | ......... | G01N 15/1433 |

*Primary Examiner* — Shervin K Nakhjavan
(74) *Attorney, Agent, or Firm* — Studebaker Brackett PLLC

(57) ABSTRACT

The present disclosure relates to a method of aligning images included in a focal stack and estimates depth information of an object in the images by extracting features of the aligned images, using a neural network model. A focal stack alignment method according to an embodiment of the present disclosure includes: calculating a relative Field of View (FoV) of a focal stack photographed by a photographing device using metadata of the photographing device; primarily aligning the focal stack on the basis of the relative FoV; determining a flow field of the focal stack using radial motion, horizontal motion, and vertical motion features of each of primarily aligned images; and secondarily aligning the focal stack using the flow field.

18 Claims, 13 Drawing Sheets

(10 of 13 Drawing Sheet(s) Filed in Color)

(56) References Cited

U.S. PATENT DOCUMENTS

| | | | |
|---|---|---|---|
| 12,235,659 B2 * | 2/2025 | Ebrahimi Afrouzi | ......................... A47L 11/4063 |
| 12,244,782 B2 * | 3/2025 | Jayaram | ............... H04N 13/344 |
| 2020/0036905 A1 * | 1/2020 | Chang | .................... G03B 13/36 |

* cited by examiner

FIG. 13

[Equation 7]

$$(R\_FoV_n - 1 + \alpha) \times \begin{bmatrix} \text{(radial)} \end{bmatrix} + \beta \times \begin{bmatrix} \text{(horizontal)} \end{bmatrix} + \gamma \times \begin{bmatrix} \text{(vertical)} \end{bmatrix} = \text{Flow field}$$

FOCAL STACK ALIGNMENT METHOD AND DEPTH ESTIMATION METHOD USING THE SAME

CROSS REFERENCE TO RELATED APPLICATION

The present application claims priority to Korean Patent Application No. 10-2022-0060800, filed May 18, 2022, the entire contents of which is incorporated herein for all purposes by this reference.

BACKGROUND OF THE INVENTION

Field of the Invention

The present disclosure relates to a method of aligning images included in a focal stack and estimates depth information of an object in the images by extracting features of the aligned images, using a neural network model.

Description of the Related Art

A Depth from Focus (DfF) technology of estimating the depth of an object through focus change can be applied to commercial cameras. The DfF technology is a technology of photographing an object while changing a focus and estimating the focus distance at a point, at which the object is in focus, as the depth of the object.

In order to improve performance of the DfF technology, studies of combining a neural network model such as a Convolutional Neural Network (CNN) with the DfF technology are conducted, but these studies overlook problems that are generated with the focus is changed actually in commercial cameras.

Representatively, in commercial cameras that are recently representative of smartphones, the Field of View (FoV) is changed by structural movement of the internal mechanical devices for changing the focus, which causes focal breathing, that is, a phenomenon that movement is generated in an object photographed while the focus is changed.

Studies of estimating depth information through a neural network model in the related art estimates depth information under the assumption that a focal stack (a set of a plurality of images taken at different focuses) that is input to a neural network model is completely aligned while neglect such focal breathing, so there is limitation that accuracy in estimation is low.

SUMMARY OF THE INVENTION

An objective of the present disclosure is to completely align images in a focal stack in consideration of the hardware limitation of a photographing device photographing a focus stack.

Another objective of the present disclosure is to extract focal features including the correlations between adjacent images in a focal stack and to create a depth map using the focal features.

The objectives of the present disclosure are not limited to those described above and other objectives and advantages not stated herein may be understood through the following description and may be clear by embodiments of the present disclosure. Further, it would be easily known that the objectives and advantages of the present disclosure may be achieved by the configurations described in claims and combinations thereof.

In order to achieve the objectives described above, a focal stack alignment method according to an embodiment of the present disclosure includes: calculating a relative Field of View (FoV) of a focal stack photographed by a photographing device using metadata of the photographing device; primarily aligning the focal stack on the basis of the relative FoV; determining a flow field of the focal stack using radial motion, horizontal motion, and vertical motion features of each of primarily aligned images; and secondarily aligning the focal stack using the flow field.

In an embodiment, the calculating of a relative FoV includes calculating the relative FoV using the distance between a lens and an image sensor in the photographing device.

In an embodiment, the calculating of a relative FoV includes calculating the relative FoV in accordance with the following [Equation 1], $$R\_FoV_n = \frac{s_{min}}{s_n} \quad \text{[Equation 1]}$$

($R\_FoV_n$ is the relative FoV, $s_{min}$ is a maximum distance between the lens and the image sensor, and $s_n$ is the distance between the lens and the image sensor for each of the images in the focal stack).

In an embodiment, the calculating of a relative FoV includes calculating the distance between the lens and the image sensor on the basis of a focal length and a focal distance of the lens in the photographing device.

In an embodiment, the calculating of a relative FoV includes calculating the distance between the lens and the image sensor in accordance with the following [Equation 2], $$s_n = \frac{F_n \times f}{F_n - f} \quad \text{[Equation 2]}$$

($s_n$ is the distance between the lens and the image sensor for each image, $F_n$ is a focal distance, and f is a focal length of the lens).

In an embodiment, the primarily aligning of the focal stack includes scaling each of the images in the focal stack using the relative FoV.

In an embodiment, the primarily aligning of the focal stack includes aligning the focal stack to fit to an image having a smallest FoV of the images in the focal stack.

In an embodiment, the determining of a flow field includes: encoding features of the primarily images; creating the radial motion, horizontal motion, and vertical motion features by decoding the features; and determining the flow field defined by the radial motion, horizontal motion, and vertical motion features.

In an embodiment, the encoding includes creating a cost volume by encoding features of the images and a reference image in the focal stack and by combining the encoded features, and the decoding includes creating the radial motion, horizontal motion, and vertical motion features by decoding the cost volume.

In an embodiment, the secondarily aligning includes warping the images in the focal stack using the flow field.

In an embodiment, the radial motion, horizontal motion, and vertical motion features are learned such that a pixel position error between a reference image in the focal stack and each of the secondarily aligned images is minimized.

In an embodiment, the secondarily aligning includes: creating a plurality of stacks having different resolutions by encoding the focal stack step by step; and sequentially aligning stacks having next higher resolutions using a flow field determined from a stack having a lower resolution.

Further, in order to achieve the objectives described above, a depth estimation method according to an embodiment of the present disclosure includes: aligning a focal stack; extracting a focal feature from the aligned focal stack; and creating a depth map using the extracted focal feature.

In an embodiment, the extracting of a focal feature includes extracting the focal feature to which correlations between adjacent images in the focal stack have been applied.

In an embodiment, the extracting of a focal feature includes: creating a feature stack by applying 2D convolution to images in the focal stack; and extracting the focal feature by applying 3D convolution to the feature stack.

In an embodiment, the extracting of a focal feature includes: extracting the focal feature by applying convolution to the focal stack; and enhancing the focal feature in accordance with correlations between adjacent images in the focal stack by downsampling the extracted focal feature.

In an embodiment, the enhancing of a focal feature includes: extracting a first feature by applying 3D convolution to the focal feature; extracting a second feature by sequentially applying max pooling and 3D convolution to the focal feature; and enhancing the focal feature by applying element-wise addition to the first and second features.

In an embodiment, the creating of a depth map includes creating the depth map by inputting the focal feature to a depth estimation neural network.

Since the present disclosure aligns images in a focal stack in consideration of hardware characteristics and limitation of a photographing device photographing the focal stack, it is possible to completely remove focal breathing that is generated by an error in FoV and a position error of a principle point.

Further, the present disclosure extracts a focal feature, to which the correlations of adjacent images in a focal stack have been applied, and creates a depth map using the focal feature, thereby being able to greatly improve the performance of a Depth from Focus (DfF) depth-based estimation neural network model.

Detailed effects of the present disclosure in addition to the above effects will be described with the following detailed description for accomplishing the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings of this specification exemplify preferred embodiments and help easy understanding of the present invention together with the following detailed description, so the present invention should not be construed as being limited to the drawings.

FIG. 13 is a Equation 7 according to some embodiments of the present application.

DETAILED DESCRIPTION OF THE INVENTION

Figure 1:
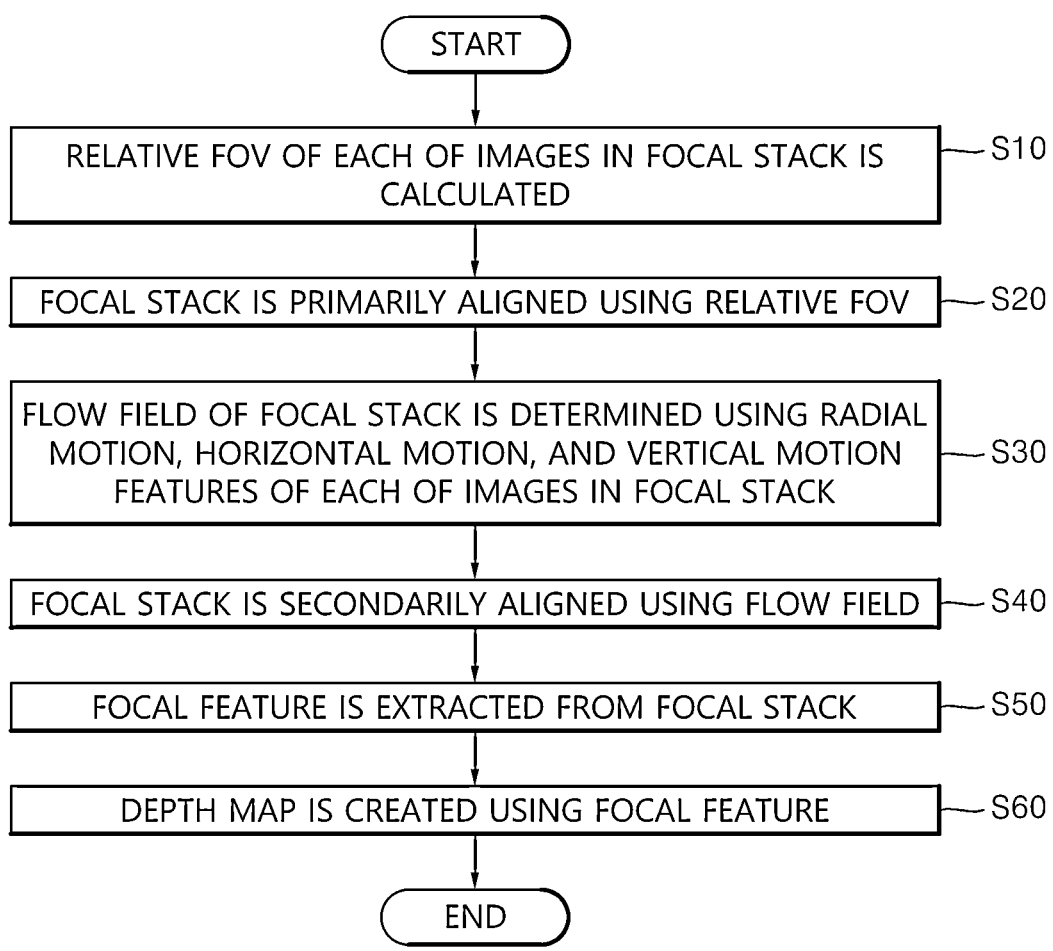
FIG. 1 is a flowchart showing a focal stack alignment method according to an embodiment of the present disclosure and a depth estimation method using the focal stack alignment method.

The objects, characteristics, and advantages will be described in detail below with reference to the accompanying drawings, so those skilled in the art may easily achieve the spirit of the present disclosure. However, in describing the present disclosure, detailed descriptions of well-known technologies will be omitted so as not to obscure the description of the present disclosure with unnecessary details. Hereinafter, exemplary embodiments of the present invention will be described with reference to accompanying drawings. The same reference numerals are used to indicate the same or similar components in the drawings.

Although terms 'first', 'second', etc. are used to describe various components in the specification, it should be noted that these components are not limited by the terms. These terms are used to discriminate one component from another component and it is apparent that a first component may be a second component unless specifically stated otherwise.

Further, when a certain configuration is disposed "over (or under)" or "on (beneath)" of a component in the specification, it may mean not only that the certain configuration is disposed on the top (or bottom) of the component, but that another configuration may be interposed between the component and the certain configuration disposed on (or beneath) the component.

Further, when a certain component is "connected", "coupled", or "jointed" to another component in the specification, it should be understood that the components may be directly connected or jointed to each other, but another component may be "interposed" between the components or the components may be "connected", "coupled", or "jointed" through another component.

Further, singular forms that are used in this specification are intended to include plural forms unless the context clearly indicates otherwise. In the specification, terms "configured", "include", or the like should not be construed as necessarily including several components or several steps described herein, in which some of the components or steps may not be included or additional components or steps may be further included.

Further, the term "A and/or B" stated in the specification means that A, B, or A and B unless specifically stated otherwise, and the term "C to D" means that C or more and D or less unless specifically stated otherwise.

Hereafter, a focal stack alignment method according to an embodiment of the present disclosure and a depth estimation method using the focal stack alignment method are described with reference to FIGS. 1 to 12.

Figure 2:
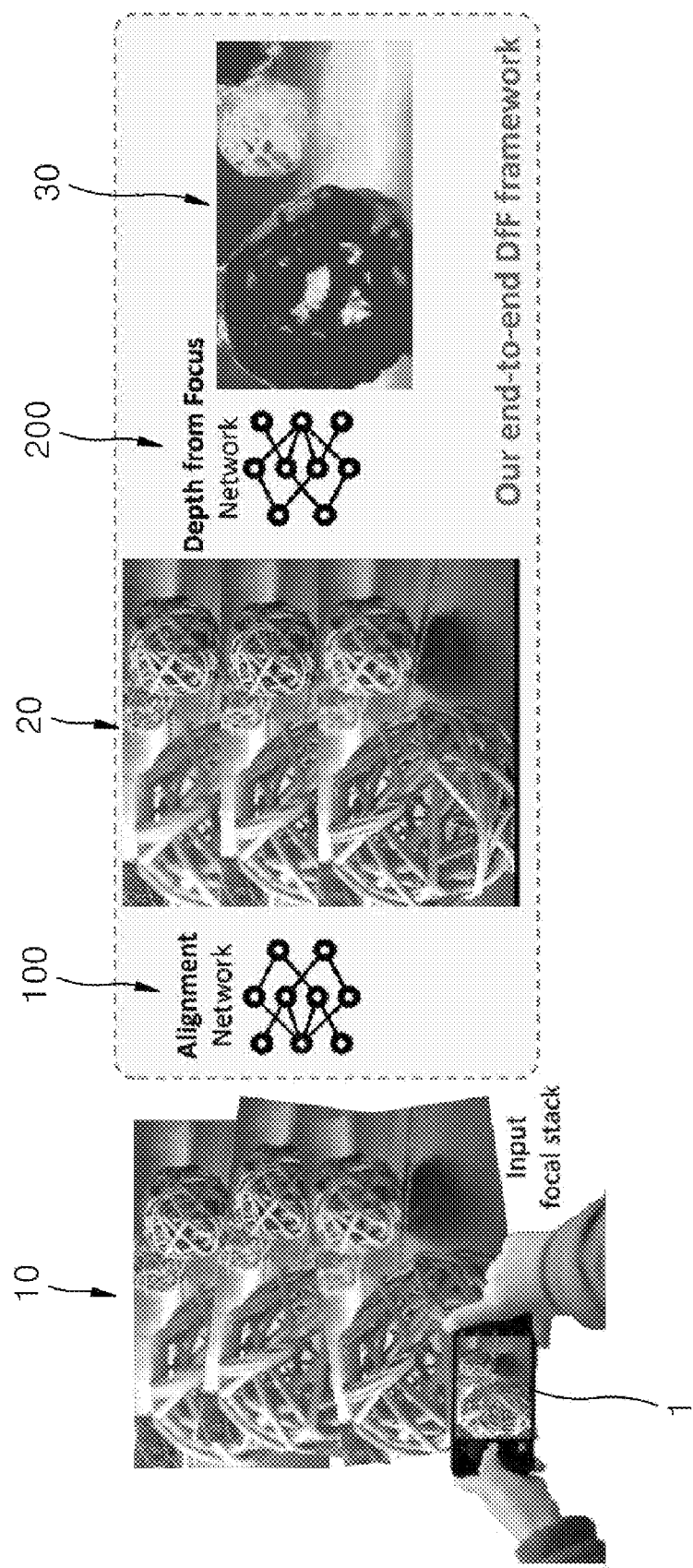
FIG. 2 is a diagram schematically illustrating the operation of the present disclosure.

FIG. 1 is a flowchart showing a focal stack alignment method according to an embodiment of the present disclosure and a depth estimation method using the focal stack alignment method. FIG. 2 is a diagram schematically illustrating the operation of the present disclosure.

Figure 3:
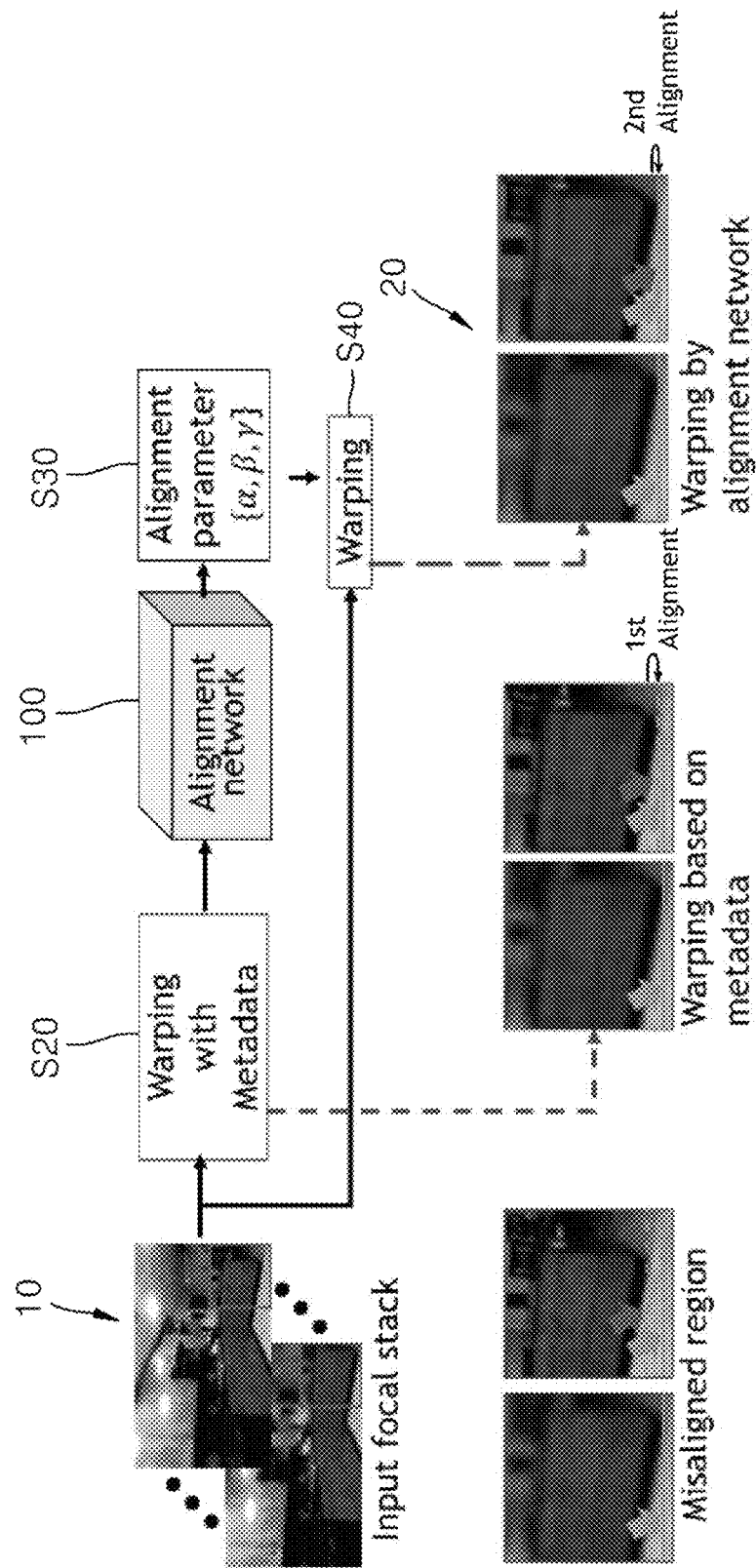
FIG. 3 is a diagram showing the state in which a focal stack is aligned in accordance with the focal stack alignment method according to an embodiment of the present disclosure.

FIG. 3 is a diagram showing the state in which a focal stack is aligned in accordance with the focal stack alignment method according to an embodiment of the present disclosure.

Figure 4:
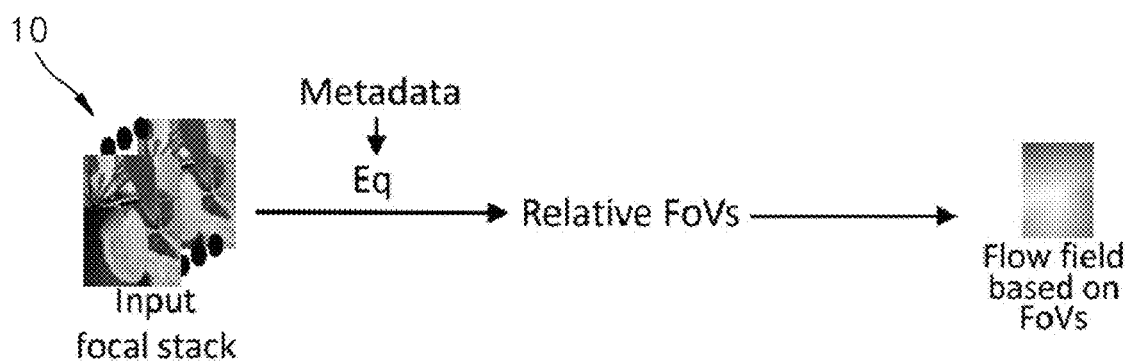
FIG. 4 is a diagram illustrating an operation of primarily aligning a focal stack on the basis of a relative FoV.
Figure 5:
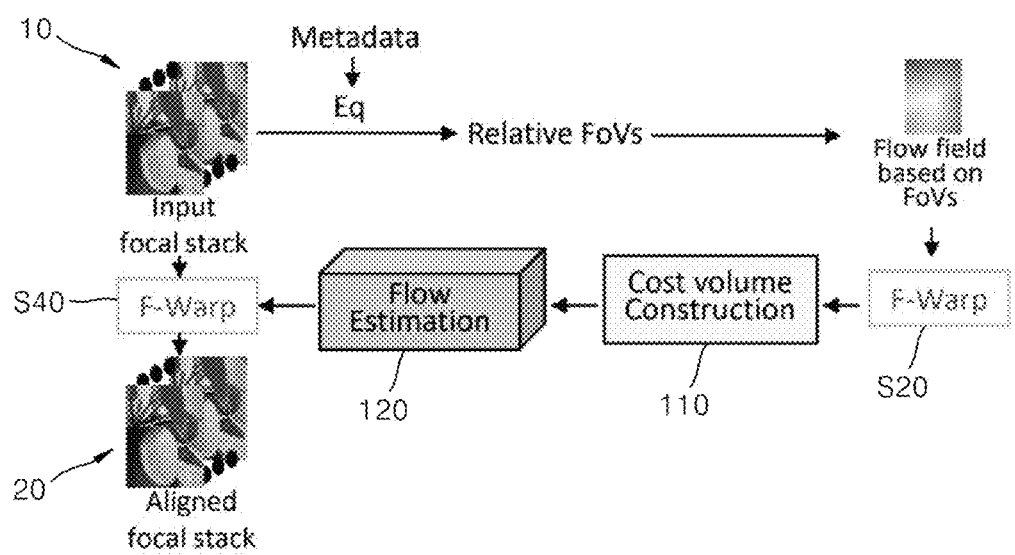
FIG. 5 is a diagram illustrating an operation of secondarily aligning a focal stack using radial motion, horizontal motion, and vertical motion features of each of images in the focal stack.

FIG. 4 is a diagram illustrating an operation of primarily aligning a focal stack on the basis of a relative FoV. FIG. 5 is a diagram illustrating an operation of secondarily aligning a focal stack using radial motion, horizontal motion, and vertical motion features of each of images in the focal stack.

Figure 6:
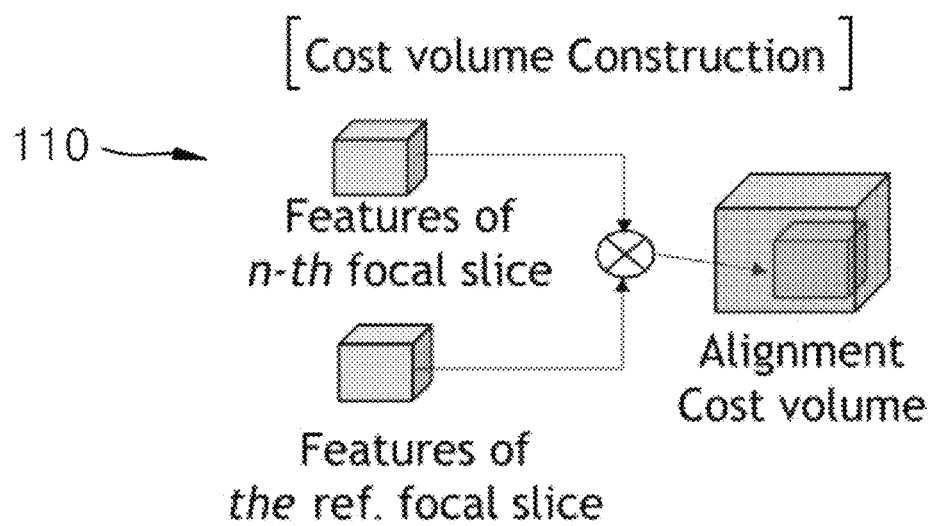
FIGS. 6 and 7 are diagrams illustrating detailed operations for secondary alignment of a focal stack.
Figure 7:
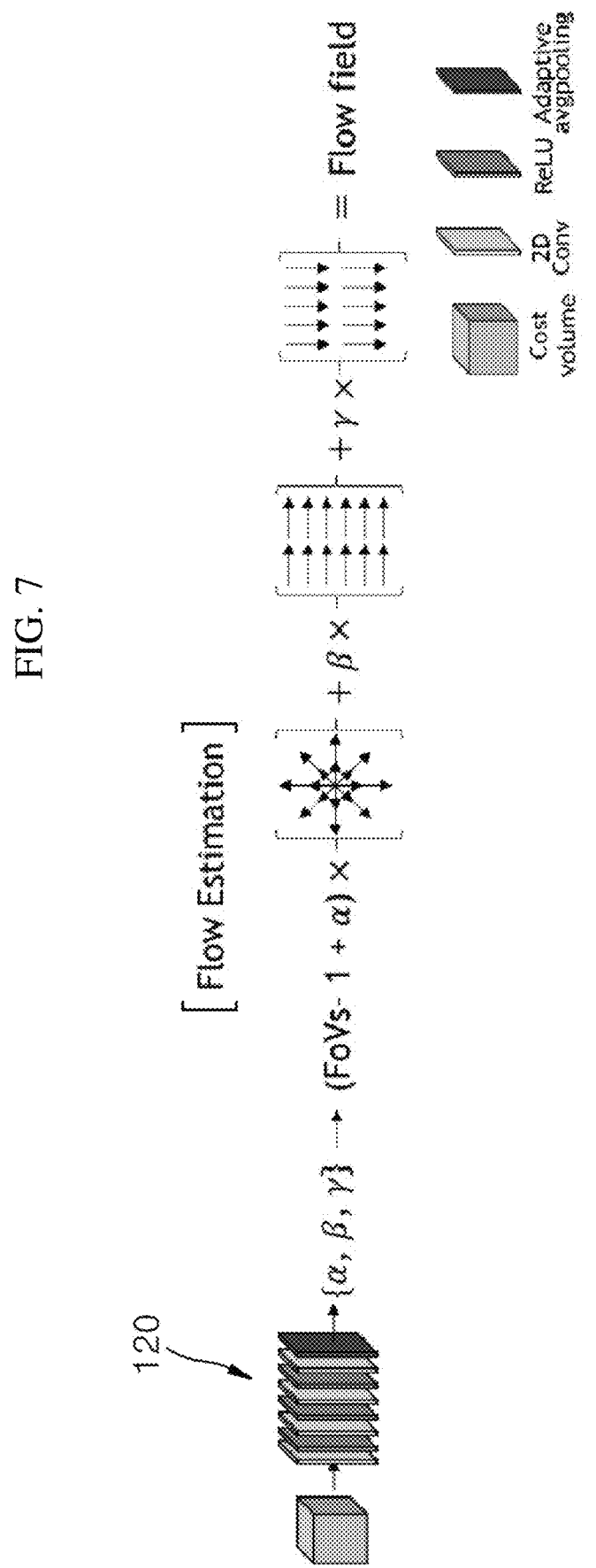
Figure 8:
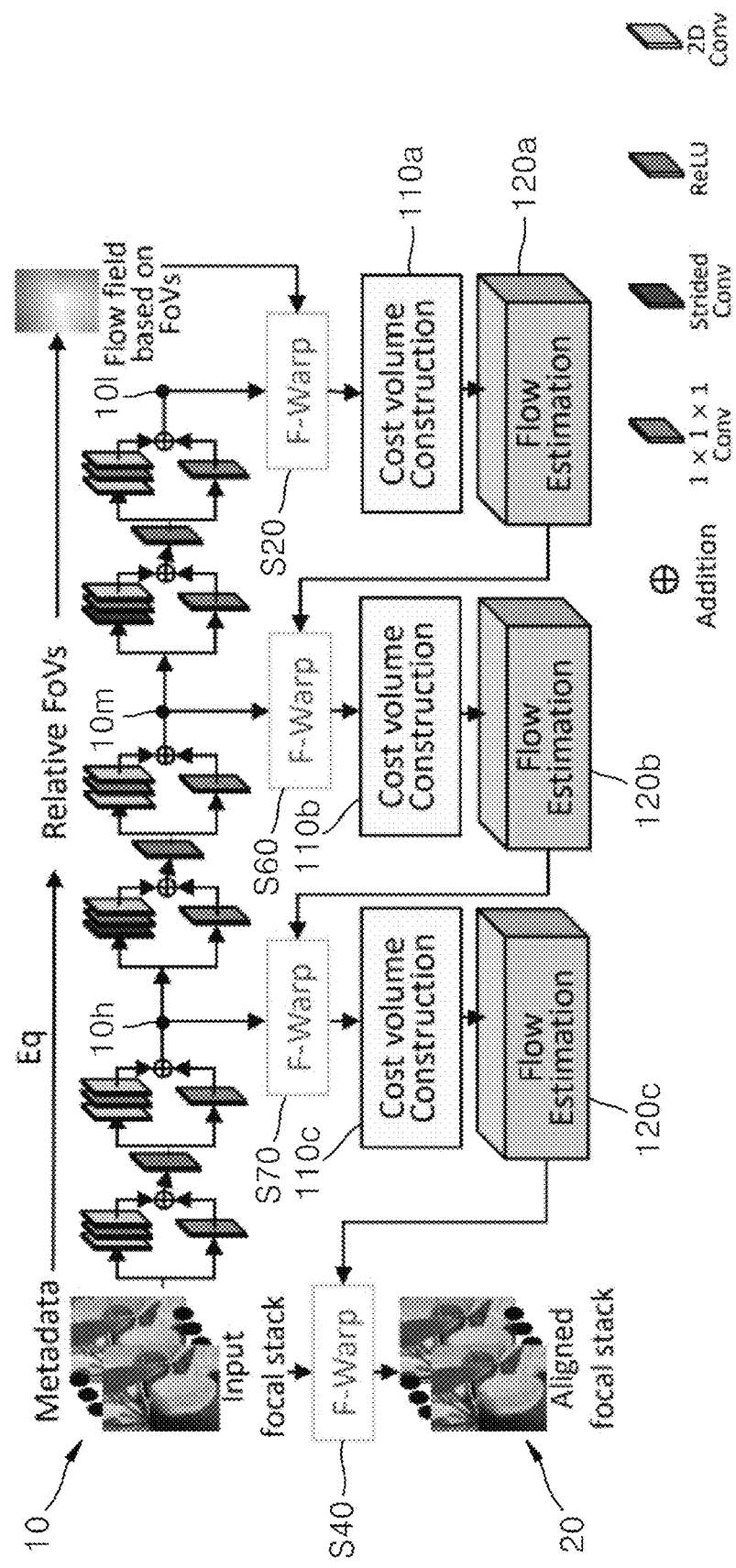
FIG. 8 is a diagram showing a process of sequentially applying the secondary alignment process from a focal stack with a low resolution to a focal stack with a high resolution.

FIGS. 6 and 7 are diagrams illustrating detailed operations for secondary alignment of a focal stack. FIG. 8 is a diagram showing a process of sequentially applying the secondary alignment process from a focal stack with a low resolution to a focal stack with a high resolution.

Figure 9:
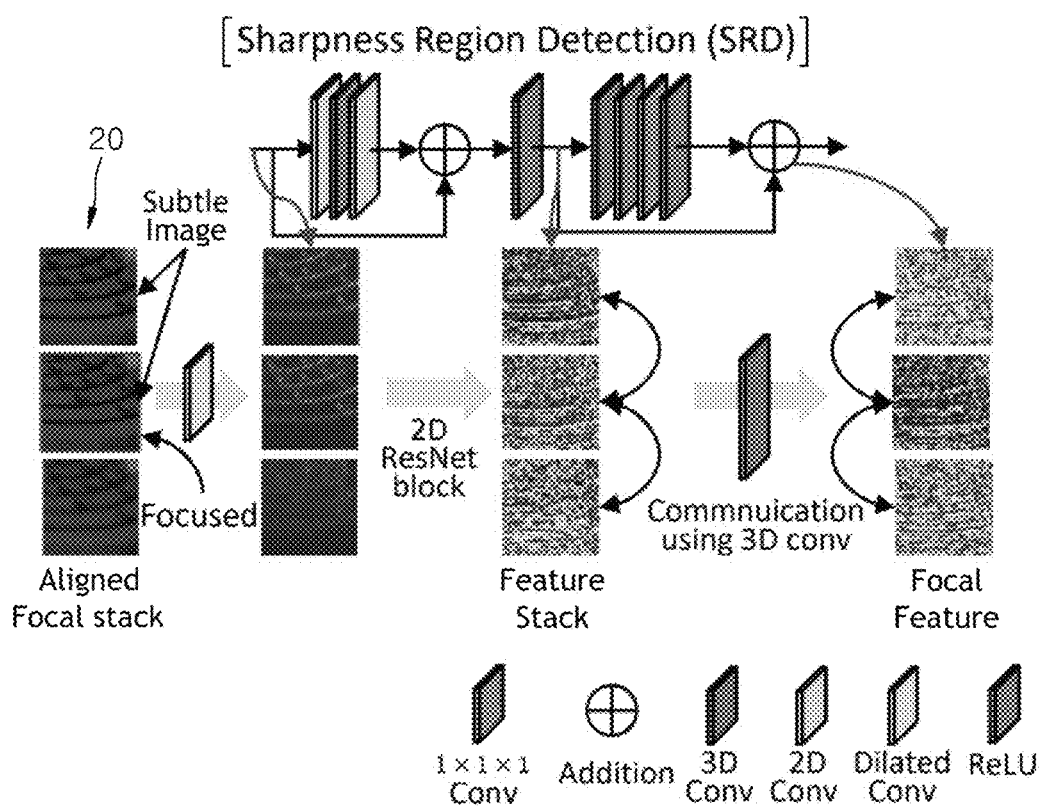
FIG. 9 is a diagram showing a process of extracting a feature stack including correlations between adjacent images in a focal stack.
Figure 10:
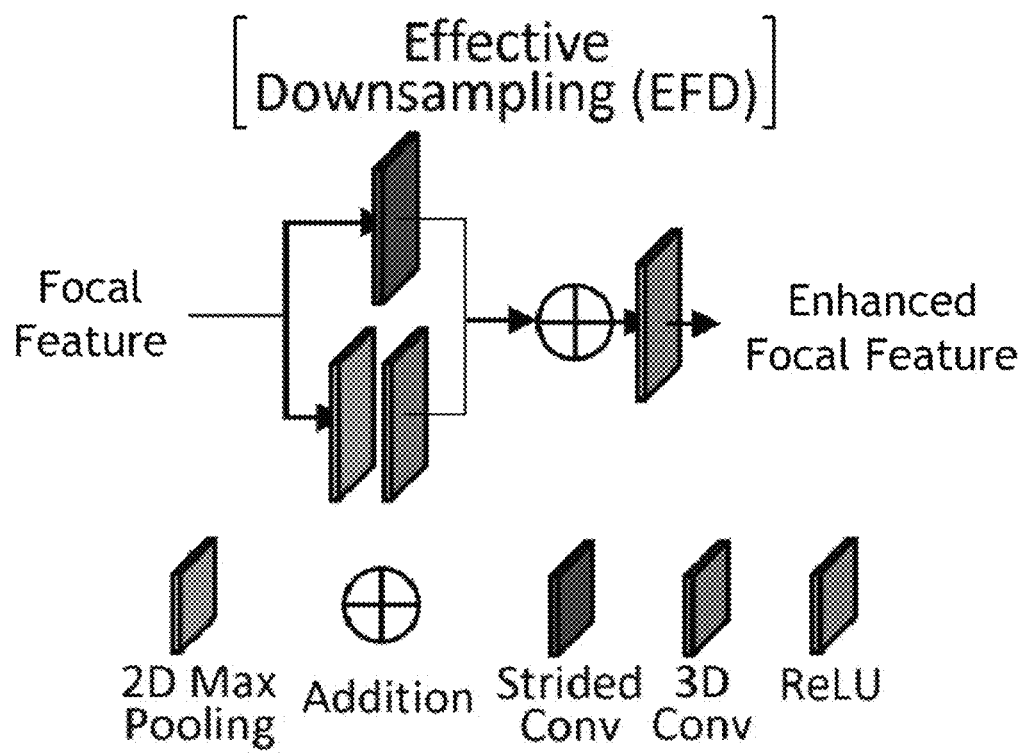
FIG. 10 is a diagram showing a process of extracting a focal feature by downsampling the feature stack extracted in FIG. 9.
Figure 11:
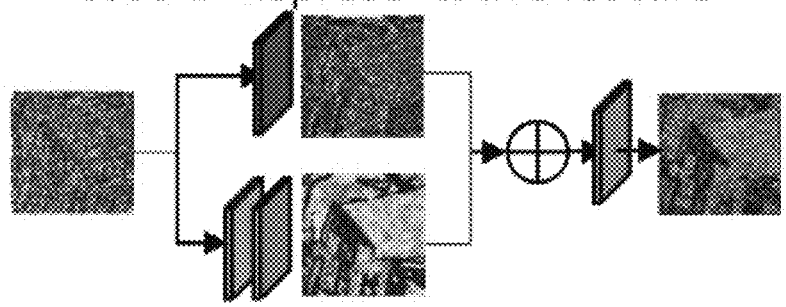
FIG. 11 is a diagram showing the state in which a high-representation feature is enhanced and a low-representation feature is weakened.
Figure 11:
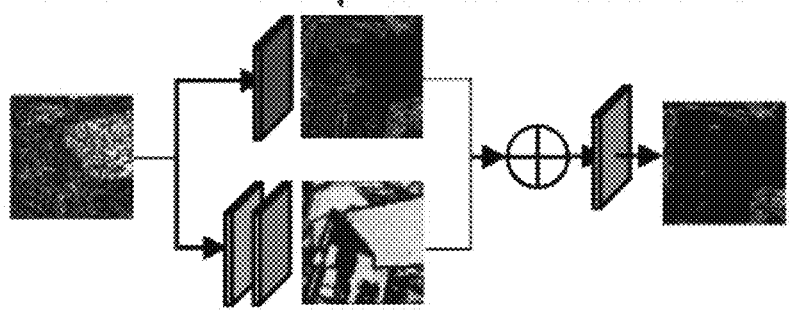

FIG. 9 is a diagram showing a process of extracting a feature stack including correlations between adjacent images in a focal stack. FIG. 10 is a diagram showing a process of extracting a focal feature by downsampling the feature stack extracted in FIG. 9. FIG. 11 is a diagram showing the state in which a high-representation feature is enhanced and a low-representation feature is weakened.

Figure 12:
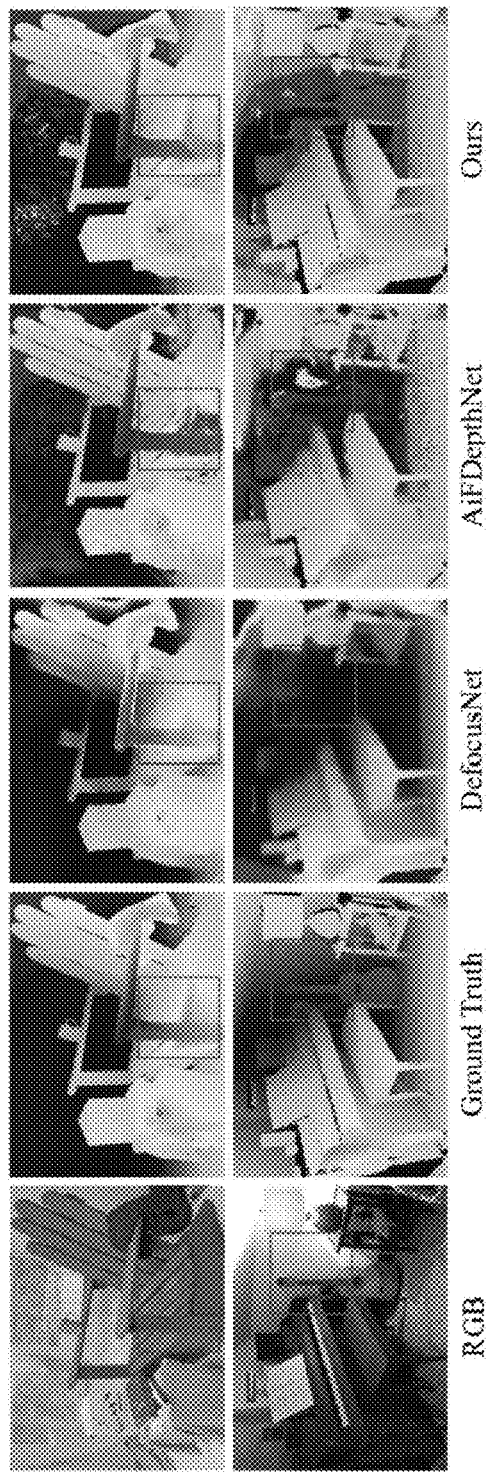
FIG. 12 is a diagram comparing depth maps created in accordance with the present disclosure and the related art, respectively.

FIG. 12 is a diagram comparing depth maps created in accordance with the present disclosure and the related art, respectively.

Referring to FIG. 1, a focal stack alignment method according to an embodiment of the present disclosure and a depth estimation method using the focal stack alignment method may include: calculating a relative FoV of each of images in a focal stack (S10); primarily aligning the focal stack using the relative FoVs (S20); determining a flow field of the focal stack using radial motion, horizontal motion, and vertical motion features of each of the images in the focal stack (S30); secondarily aligning the focal stack using the flow field (S40); extracting a focal feature of the focal stack (S50); and creating a depth map using the focal feature (S60).

However, the focal stack alignment method and the depth estimation method using the focal stack alignment method shown in FIG. 1 are based on an embodiment, the steps of the present disclosure are not limited to the embodiment shown in FIG. 1, and if necessary, some steps may be added, changed, or removed.

The steps shown in FIG. 1 may be performed by a processor such as a central processing unit (CPU), a graphics processing unit (GPU), etc., and the processor, in order to perform operations to be described below, may include at least one physical element of application specific integrated circuits (ASICs), digital signal processors (DSPs), digital signal processing devices (DSPDs), programmable logic devices (PLDs), field programmable gate arrays (FPGAs), a controller, and micro-controllers.

The present disclosure relates to a method of aligning images included in a focal stack and estimates depth information of an object in the images by extracting features of the aligned images, using a neural network model.

Referring to FIG. 2, the present disclosure can create an aligned focal stack 20 by inputting a focal stack 10 taken by a certain photographing device 1 into an alignment neural network 100, and can create a depth map 30 by inputting the aligned focal stack 20 into a depth estimation neural network 200. The focal stack 10 described in the present disclosure may be a set of a plurality of images (slices) taken at different focuses by a fixed photographing device 1.

Hereafter, a method of aligning the focal stack 10 is described first in detail with reference to FIGS. 3 to 8.

Referring to FIG. 3, when the photographing device 1 takes the focal stack 10 while changing the focus, the Field of View (FoV) of the photographing device 1 changes, which may cause a phenomenon that the position of a specific object is not fixed in the focal stack 10. Accordingly, as shown in FIG. 3, a misaligned region may be generated in the focal stack 10.

In order to primarily align the focal stack 10, a processor can calculate a relative FoV of each of images in the focal stack 10 using metadata of the photographing device 1 (S10).

In this case, the metadata may include certain data showing the natural features of the photographing device 1, and for example, may include the focal length and the focal distance of the photographing device 1, the distance between a lens and an image sensor in the photographing device 1, the size of the image sensor, etc. The metadata may be stored in advance in a memory that a processor can access, or a processor may receive the metadata from the photographing device 1.

The relative FoV ($R\_FoV_n$) may mean an FoV ratio of each image to a reference image of a plurality of images in the focal stack 10, and can be expressed as in the following [Equation 1].

$$R\_FoV_n = \frac{FoV_n}{FoV_{ref}} \quad \text{[Equation 1]}$$

(where $FoV_n$ is the FoV of each of images in the focal stack 10 and $FoV_{ref}$ is the FoV of a reference image in the focal stack 10).

Meanwhile, the FoV of each image can be expressed as in the following [Equation 2], but the working distance W of the photographing device 1 and the size A of the image sensor are the same in all of the images in the focal stack 10, so the FoV can be expressed as in the following [Equation 3].

$$FoV_n = W \times \frac{A}{s_n} \quad \text{[Equation 2]}$$

(where $s_n$ is the distance of a lens and an image sensor for each of images in the focal stack 10).

$$R\_FoV_n = \frac{s_{ref}}{s_n} \quad \text{[Equation 3]}$$

(where $s_{ref}$ is the distance of a lens and an image sensor for the reference image in the focal stack 10).

Accordingly, a processor can calculate a relative FoV using the distance between an image sensor and a lens for each of images in the focal stack 10. In detail, the processor can recognize the distance between a lens and an image sensor for each of images in the focal stack 10 on the basis of the metadata stored in a memory or received from the photographing device 1, and can calculate a relative FoV by substituting the distance into [Equation 3].

Meanwhile, the distance between a lens and an image sensor may not be included in the metadata of the photographing device 1. The processor can calculate the distance between a lens and an image sensor on the basis of the focal length and the focal distance of a lens included in the metadata. The focal length may mean the length between a lens and a focus and the focal distance may mean the distance between a focused object and a lens.

In detail, the processor can calculate the distance between a lens and an image sensor in accordance with the following [Equation 4] and can calculate a relative FoV by applying the distance to [Equation 3].

$$s_n = \frac{F_n \times f}{F_n - f} \quad \text{[Equation 4]}$$

(where $F_n$ is a focal distance and f is the focal length of a lens).

When a relative FoV is calculated, as described above, the processor can primarily align the focal stack 10 on the basis of the relative FoV (S20).

Since the relative FoV is defined as the ratio of an FoV to a reference image, the relative FoV can be used to align the images in the focal stack with the reference image.

However, when the FoV of the reference image is larger than those of other images, the reference image may include more object information in comparison to the other images. In this case, when the other images are aligned with the reference image, the object information included in the reference image may not exist in the other images, so it may be impossible to align all of pixels of the images.

In order to prevent this problem, the processor can set an image having a smallest FoV of a plurality of images constituting the focal stack 10 as a reference image. Accordingly, [Equation 1] and [Equation 3] described above can be expressed as the following [Equation 5] and [Equation 6], respectively.

$$R\_FoV_n = \frac{FoV_n}{FoV_{min}} \quad \text{[Equation 5]}$$

(where $FOV_{min}$ is a minimum FoV of images in the focal stack 10).

$$R\_FoV_n = \frac{s_{min}}{s_n} \quad \text{[Equation 6]}$$

(where $s_{min}$ is the distance of a lens and an image sensor for the image having a smallest FoV in the focal stack 10).

As described above, when the image having a smallest FoV is set as a reference image, all object information included in the reference image is included in other images, so when the other images are aligned with the reference images, it is possible to align all of pixels of the images. Accordingly, it is preferable that the reference image to be described hereafter is understood as an image having a smallest FoV of a plurality of images in the focal stack 10.

The processor can align the focal stack 10 by applying the relative FoV calculated above to each image. A primary alignment operation uses only the ratio of FoVs under the assumption that the principle point of a lens in the photographing device 1 is fixed, so the processor can scale each of the images in the focal stack 10 using the relative FoV.

Accordingly, images can be enlarged/reduced to fit to the FoV of the reference image around the principle point of the lens in the primary alignment operation, and as described above, when an image having a smallest FoV is set as the reference image, the images in the focal stack can be aligned to fit to the smallest FoV.

In an embodiment, referring to FIG. 4, the processor can create a flow field (or optical flow field) by converting a pixel movement amount of each image, which changes in accordance with a relative FoV, into a vector. Next, the processor can align images by warping a corresponding flow field to each of the images.

When the focal stack 10 is primarily aligned in accordance with the method described above, the focal stack 10 may not be completely aligned due to hardware limitation of the photographing device 10. For example, recently, a voice coil motor (VCM) is used for the cameras of smartphones to adjust a focal distance and the VCM moves a lens using a spring, and the elasticity of the spring may change in accordance with the temperature or use period of the smartphones, so there may be a difference between an actual focal distance and a focal distance corresponding to metadata.

Further, the lens and the image sensor of the photographing device 1 may not be disposed completely in parallel due to imperfection in a manufacturing process, and in this case, the principle point of the lens may be moved when the photographing device 1 photographs the focal stack 10 while changing the focus.

Focal breathing still appears in the focal stack 1 primarily aligned above due to the errors of the focal distance and the principle point, so the present disclosure can completely align the focal stack 10 by secondarily aligning the focal stack 10.

Hereafter, a secondary alignment operation of the present disclosure is described in detail.

Referring to FIG. 3 again, when the primary alignment operation for the focal stack 10 (S20) is finished in accordance with the method described above, the processor can determine a flow filed of the focal stack using the features $\alpha$, $\beta$, and $\gamma$ of a radial motion, a horizontal motion, and a vertical motion of each of the primarily aligned images (S30), and can secondarily align the focal stack 10 using the flow field (S40).

The radial motion feature $\alpha$ may be determined by momentum of each image pixel with respect to the reference image (in the enlarging/reducing direction) and can be used to correct misalignment due to a focal distance error (i.e., an error in FoV). Meanwhile, the horizontal motion and vertical motion features $\beta$ and $\gamma$ may be determined by horizontal and vertical momentum of each image pixel with respect to the reference image and can be used to correct misalignment due to an error of the principle point.

First, the process can create radial motion, horizontal motion, and vertical motion features $\alpha$, $\beta$, and $\gamma$ by inputting the primarily aligned focal stack 10 into an alignment neural network 100, and can determine a flow field using the features.

The alignment neural network 100 can receive the primarily aligned focal stack 10 and can output the radial motion, horizontal motion, and vertical motion features α, β, and γ. In detail, the processor can encode the features of primarily aligned images using the alignment neural network 100 and can create radial motion, horizontal motion, and vertical motion features α, β, and γ by decoding the encoded features.

Referring to FIG. 5, for the operation described above, the alignment neural network 100 may include encoder-decoder 110 and 120. The encoder 110 can receive the primarily aligned focal stack 10 and can extract a correlative feature between each of images in the focal stack 10 and the reference image. The decoder 120 can output radial motion, horizontal motion, and vertical motion features α, β, and γ by decoding the correlative features extracted by the encoder 110.

Exemplarily describing the operation of the encoder-decoder 110 and 120 with reference to FIGS. 6 and 7, the encoder 110 encodes features of each of images (n-th focal slice) in the primarily aligned focal stack 10 and the reference image (ref. focal slice) and combines the encoded features, thereby being able to create a cost volume. The cost volume is determined by an intensity difference between pixels of each image and the reference image, so it may include the correlative feature between each image and the reference image.

The decoder 120 can create radial motion, horizontal motion, and vertical motion features α, β, and γ by decoding the cost volume. In this case, an adoptive pooling technique may be applied to the decoder 120 so that the decoder 120 can create three features α, β, and γ regardless of the magnitude of the cost volume. Accordingly, even though any image is used as a reference image in the focal stack 10, the decoder can always create radial motion, horizontal motion, and vertical motion features α, β, and γ.

Referring to FIG. 7 again, the processor can determine a flow field using the radial motion, horizontal motion, and vertical motion features α, β, and γ output from the alignment neural network 100. In detail, the flow field can be defined as in [Equation 7] shown in FIG. 13, and it is possible to determine a flow field by substituting the motion features α, β, and γ into [Equation 7] shown in FIG. 13.

When $R\_FoV_n$ is always 1 or more in accordance with [Equation 6] described above, $R\_FoV_n-1+\alpha$ may be defined as a radial movement amount of a flow field to simplify feature values. Meanwhile, β and γ may be defined as the horizontal and vertical movement amounts of a flow field, respectively. The motion features α, β, and γ are created by correlative features between a reference image and each image, so radial, horizontal, and vertical movement amounts may be understood as movement amounts of images with respect to the reference image, respectively.

Accordingly, the radial motion feature α defining a flow field can compensate for a focal distance error (i.e., an error in FoV), and the horizontal motion and vertical motion features β and γ can compensate for an error of a principle point.

Referring to FIG. 3 again, the processor can secondarily align the focal stack 10 by applying the flow field determined above to the misaligned focal stack 10. In other words, the processor determines a flow field from the primarily focal stack 10 and applies the flow field to the misaligned focal stack 10, thereby being able to perform a secondary alignment operation.

In detail, the processor can warp each of the images in the misaligned focal stack 10 using the flow field, and accordingly, alignment of the focal stack 10 can be completed.

Since the secondary alignment operation described above is also to align images in accordance with a reference image, the radial motion, horizontal motion, and vertical motion features α, β, and γ created in the alignment neural network can be learned such that the pixel position error between the reference image in the misaligned focal stack 10 and each of the secondarily aligned image is minimized.

In detail, the processor can apply a loss function, which adds up the pixel position differences between the reference image and the images to which the secondary alignment operation has been applied, to the alignment neural network 100, and radial motion, horizontal motion, and vertical motion features α, β, and γ can be learned and updated to minimize the loss function through gradient descent.

Meanwhile, the secondary alignment operation described above may be repeatedly applied, depending on the resolution of the focal stack 10. In detail, the processor can create a plurality of stacks having different resolutions by encoding the focal stack 10 step by step. Next, the processor can sequentially align stacks having next higher resolutions using the flow field determined from a stack having a lower resolution.

Referring to FIG. 8, the processor can sequentially apply encoding to the focal stack 10 three times. The focal stack 10 may be converted into a high-resolution stack 10$h$ through first encoding, converted into a medium-resolution stack 10$m$ through next second encoding, and converted into a low-resolution stack 10$l$ through next third encoding.

The processor can align first the low-resolution stack 10$l$ on the basis of a relative FoV (S20) and can determine a first flow field by applying first encoder-decoder 110$a$ and 120$b$ to the aligned low-resolution stack 10$l$. Next, the processor can align the medium-resolution stack 10$m$ using the first flow field (S60) and can determine a second flow field by applying second encoder-decoder 110$b$ and 120$b$ to the aligned medium-resolution stack 10$m$.

Next, the processor can align the high-resolution stack 10$h$ using the second flow field (S70) and can determine a third flow field by applying third encoder-decoder 110$c$ and 120$c$ to the aligned high-resolution stack 10$h$. Finally, the processor can align the misaligned focal stack 10 using the third flow field (S40), whereby the operation of aligning the focal stack 10 can be finished.

As described above, when the secondary alignment operation is repeatedly applied, depending on a resolution, it is possible to determine radial motion, horizontal motion, and vertical motion features α, β, and γ at a lower resolution (fewer pixels) and it is possible to align a higher-resolution stack using the features, whereby, as a result, it is possible to improve alignment accuracy of the focal stack.

As described above, since the present disclosure aligns images in the focal stack 10 in consideration of not only the hardware characteristics (metadata) of the photographing device 1 photographing the focal stack 10, but the structural limitation of the device, it is possible to completely remove focal breathing that is generated by an error in FoV and a position error of a principle point.

Next, a depth estimation method is described in detail with reference to FIGS. 9 to 11.

When a focal stack 20 is aligned in accordance with the method described above, the processor can extract a focal feature from the aligned focal stack (S50). The focal feature may be sharpness of each of images constituting the focal stack 20 and may be used as input of various neural network models for Depth from Focus (DfF).

The processor can extract a focal feature by applying convolution to the focal stack 20 such that the correlations between adjacent images in the focal stack 20 are applied to the focal feature. To this end, the processor can use both 2D convolution and 3D convolution.

Describing with reference to the Sharpness Region Detection (SRD) architecture shown in FIG. 9, first, the processor can create a feature stack by sequentially applying 2D convolution, in detail, 3D dilated convolution and 2D ResNet to each of images in the focal stack 20. Next, the processor can extract a focal feature by applying 3D convolution to the feature stack.

The focal stack 20 is a set of imaged taken while a focus is changed, so the focuses of adjacent images may be similar. The processor can additionally apply 3D convolution to the feature stack so that a neural network can lean these correlations. Accordingly, as shown in FIG. 9, the focal features of a first image and a second image (subtle image) of three images in the focal stack 20 are not clearly discriminated when only 2D convolution is applied, but 3D convolution is additionally applied, so it can be seen that a focal feature is extracted best from the second image.

In addition, the processor can enhance the focal feature extracted through convolution in accordance with the correlations of adjacent images in the focal stack 20. In detail, the processor can enhance a focal feature through downsampling to which 3D convolution has been applied.

Describing with reference to the Effective Downsampling (EFD) architecture shown in FIG. 10, the processor can extract a first feature by applying 3D strided convolution to match the output and magnitude of 3D convolution, in detail, pooling to be described below to a focal feature. The processor can extract a second feature by sequentially applying max pooling and 3D convolution to the focal feature. Next, the processor an enhance the focal feature by applying element-wise addition to the first and second features.

Since the focuses of adjacent images are similar, as described above, the focal features extracted from adjacent images may also be similar. The processor can additionally apply max pooling and 3D convolution in the downsampling process so that a neural network can lean these correlations. A feature having the highest sharpness of the focal features can be downsampled through max pooling, and the correlations of adjacent images can be converted into data by applying 3D convolution to the downsampled feature.

The high-representation focal features are enhanced in accordance with the focal feature enhancement operation, but low-representation features may be weakened.

Referring to FIG. 11, when a portion with high sharpness is shown by red and a portion with low sharpness is shown by blue in a focal feature, as shown in Case 1, a high-representation (red pixel-rich) focal feature can be enhanced, that is, the red pixels in the focal feature can be increased through the EFD architecture. However, as shown in Case 2, the low-representation (red pixel-poor) focal feature can be weakened, that is, the red pixels in the focal feature can be reduced through the EFD architecture.

When a focal feature is extracted and/or enhanced in accordance with the method described above, the processor can create a depth map 30 using the focal feature (S60). In detail, the processor can create a depth map 30 by inputting a focal feature into a depth estimation neural network 200, as shown in FIG. 2.

The depth estimation neural network 200 may include a neural network model that is operated on the basis of Depth from Focus (DfF) of various neural network models that are used in the field of the present disclosure, and may include a certain architecture that creates the depth map 30 using at least one input focal feature. An architecture in the depth estimation neural network 200 and/or a neural network may be supervised-trained by a training dataset having a focal feature as an input datum and the actual depth map (Ground Truth (GT)) 30 of an object in the focal stack 20 as a label data.

Referring to FIG. 2, it can be seen that the depth map 30 created in accordance with the present disclosure (Ours) is closer to an actual measurement value (Ground Truth) than DefocusNet (proposed in the ⌈Focus on defocus: bridging the synthetic to real domain gap for depth estimation⌋, CVPR 2020) and AiFDepthNet (proposed in the ⌈Bridging Unsupervised and Supervised Depth from Focus via All-in-Focus Supervision⌋, ICCV 2021) that are the most recent technologies published up to now.

As described above, the present disclosure extracts a focal feature, to which the correlations of adjacent images in the focal stack 20 have been applied, and creates a depth map 30 using the focal feature, thereby being able to greatly improve the performance of a Depth from Focus (DfF) depth-based estimation neural network 200 model.

Although the present disclosure was described with reference to the exemplary drawings, it is apparent that the present disclosure is not limited to the embodiments and drawings in the specification and may be modified in various ways by those skilled in the art within the range of the spirit of the present disclosure. Further, even though the operation effects according to the configuration of the present disclosure were not clearly described with the above description of embodiments of the present disclosure, it is apparent that effects that can be expected from the configuration should be also admitted.

What is claimed is:

1. A focal stack alignment method comprising:
    calculating a relative Field of View (FoV) of a focal stack photographed by a photographing device using metadata of the photographing device;
    primarily aligning the focal stack on the basis of the relative FoV;
    determining a flow field of the focal stack using radial motion, horizontal motion, and vertical motion features of each of primarily aligned images; and
    secondarily aligning the focal stack using the flow field.

2. The focal stack alignment method of claim 1, wherein the calculating of a relative FoV includes calculating the relative FoV using the distance between a lens and an image sensor in the photographing device.

3. The focal stack alignment method of claim 2, wherein the calculating of a relative FoV includes calculating the relative FoV in accordance with the following [Equation 1], $$R\_FoV_n = \frac{s_{min}}{s_n} \qquad \text{[Equation 1]}$$

($R\_FoV_n$ is the relative FoV, $s_{min}$ is a maximum distance between the lens and the image sensor, and $s_n$ is the distance between the lens and the image sensor for each of the images in the focal stack).

4. The focal stack alignment method of claim 2, wherein the calculating of a relative FoV includes calculating the distance between the lens and the image sensor on the basis of a focal length and a focal distance of the lens in the photographing device.

5. The focal stack alignment method of claim 4, wherein the calculating of a relative FoV includes calculating the distance between the lens and the image sensor in accordance with the following [Equation 2], $$s_n = \frac{F_n \times f}{F_n - f} \quad \text{[Equation 2]}$$

($s_n$ is the distance between the lens and the image sensor for each image, $F_n$ is a focal distance, and f is a focal length of the lens).

6. The focal stack alignment method of claim 1, wherein the primarily aligning of the focal stack includes scaling each of the images in the focal stack using the relative FoV.

7. The focal stack alignment method of claim 1, wherein the primarily aligning of the focal stack includes aligning the focal stack to fit to an image having a smallest FoV of the images in the focal stack.

8. The focal stack alignment method of claim 1, wherein the determining of a flow field includes:
   encoding features of the primarily images;
   creating the radial motion, horizontal motion, and vertical motion features by decoding the features; and
   determining the flow field defined by the radial motion, horizontal motion, and vertical motion features.

9. The focal stack alignment method of claim 8, wherein the encoding includes creating a cost volume by encoding features of the images and a reference image in the focal stack and by combining the encoded features, and
   the decoding includes creating the radial motion, horizontal motion, and vertical motion features by decoding the cost volume.

10. The focal stack alignment method of claim 1, wherein the secondarily aligning includes warping the images in the focal stack using the flow field.

11. The focal stack alignment method of claim 1, wherein the radial motion, horizontal motion, and vertical motion features are learned such that a pixel position error between a reference image in the focal stack and each of the secondarily aligned images is minimized.

12. The focal stack alignment method of claim 1, wherein the secondarily aligning includes:
   creating a plurality of stacks having different resolutions by encoding the focal stack step by step; and
   sequentially aligning stacks having next higher resolutions using a flow field determined from a stack having a lower resolution.

13. A depth estimation method comprising:
   aligning a focal stack in accordance with claim 1;
   extracting a focal feature from the aligned focal stack; and
   creating a depth map using the extracted focal feature.

14. The depth estimation method of claim 13, wherein the extracting of a focal feature includes extracting the focal feature to which correlations between adjacent images in the focal stack have been applied.

15. The depth estimation method of claim 13, wherein the extracting of a focal feature includes:
   creating a feature stack by applying 2D convolution to images in the focal stack; and
   extracting the focal feature by applying 3D convolution to the feature stack.

16. The depth estimation method of claim 13, wherein the extracting of a focal feature includes:
   extracting the focal feature by applying convolution to the focal stack; and
   enhancing the focal feature in accordance with correlations between adjacent images in the focal stack by downsampling the extracted focal feature.

17. The depth estimation method of claim 16, wherein the enhancing of a focal feature includes:
   extracting a first feature by applying 3D convolution to the focal feature;
   extracting a second feature by sequentially applying max pooling and 3D convolution to the focal feature; and
   enhancing the focal feature by applying element-wise addition to the first and second features.

18. The depth estimation method of claim 13, wherein the creating of a depth map includes creating the depth map by inputting the focal feature to a depth estimation neural network.

* * * * *